(12) United States Patent
Cadot et al.

(10) Patent No.: US 11,925,255 B2
(45) Date of Patent: Mar. 12, 2024

(54) METHOD FOR MANUFACTURING A DENTAL BRUSHING PART, AND DENTAL BRUSHING PART

(71) Applicant: FASTEESH, Lyons (FR)

(72) Inventors: Christophe Cadot, Lyons (FR); Benjamin Cohen, Lyons (FR)

(73) Assignee: FASTEESH, Lyons (FR)

( * ) Notice: Subject to any disclaimer, the term of this patent is extended or adjusted under 35 U.S.C. 154(b) by 516 days.

(21) Appl. No.: 17/057,454

(22) PCT Filed: May 14, 2019

(86) PCT No.: PCT/FR2019/051081
§ 371 (c)(1),
(2) Date: Nov. 20, 2020

(87) PCT Pub. No.: WO2019/224450
PCT Pub. Date: Nov. 28, 2019

(65) Prior Publication Data
US 2021/0161287 A1 Jun. 3, 2021

(30) Foreign Application Priority Data
May 22, 2018 (FR) ...................................... 18/54219

(51) Int. Cl.
*A46D 3/00* (2006.01)
*A46B 3/06* (2006.01)
(Continued)

(52) U.S. Cl.
CPC ................ *A46D 3/005* (2013.01); *A46B 3/06* (2013.01); *A46B 5/0095* (2013.01); *A46B 9/045* (2013.01); *A46D 3/045* (2013.01); *A61C 17/228* (2013.01)

(58) Field of Classification Search
CPC .......... A46D 3/005; A46D 3/045; A46B 3/06; A46B 5/0095; A46B 99/045
See application file for complete search history.

(56) References Cited

U.S. PATENT DOCUMENTS

| 4,635,313 A | 1/1987 | Fassler et al. |
| 2011/0225758 A1 | 9/2011 | Chung |

(Continued)

FOREIGN PATENT DOCUMENTS

| CN | 2166673 Y | 6/1994 |
| CN | 1294889 A | 5/2001 |

(Continued)

OTHER PUBLICATIONS

English Translation to International Search Report for Application No. PCT/FR2019/051081.

(Continued)

*Primary Examiner* — Shay Karls
(74) *Attorney, Agent, or Firm* — CANTOR COLBURN LLP (57) ABSTRACT

A method for manufacturing a brushing part, the brushing part being configured in a U-shape in order to be placed on the dentition of a jaw of a user, the brushing part forming a channel inside which is designed to receive all or a portion of said dentition, the brushing part comprising at least one tuft of brushing bristles projecting into the interior of said channel by a free end of the bristles of the at least one tuft, the method comprising the following steps: —forming the at least one tuft of bristles by assembling a plurality of bristles by an end opposite the free end, so as to form a base of the at least one tuft; —fusing the ends forming the base of the at least one tuft so as to form a fused area in one piece, such that an extension of the fused area in a direction that is transverse to an extension direction of the at least one tuft is greater at one extension of the base in the transverse (Continued)

direction prior to the fusing step; —placing the at least one tuft on a mold for overmolding the channel of the brushing part; —overmolding the channel and the at least one tuft.

19 Claims, 4 Drawing Sheets

(51) Int. Cl.
*A46B 5/00* (2006.01)
*A46B 9/04* (2006.01)
*A46D 3/04* (2006.01)
*A61C 17/22* (2006.01)

(56) References Cited

U.S. PATENT DOCUMENTS

2014/0272761 A1  9/2014  Lowe et al.
2019/0298048 A1  10/2019  Zhang

FOREIGN PATENT DOCUMENTS

| CN | 101401681 A | 4/2009 |
| CN | 105768520 A | 7/2016 |
| CN | 107669363 A | 2/2018 |

OTHER PUBLICATIONS

International Search Report for Application No. PCT/FR2019/051081.
Written Opinion for Application No. PCT/FR2019/051081.
English Translation to Written Opinion for Application No. PCT/FR2019/051081.
First CN Office Action for CN Application No. 201980048702.8 dated Dec. 24, 2021; 10 Pages.
First Search for Chinese Application No. 2019800487028; Date of Filing: Jan. 20, 2021; 1 Page.
Translation of First CN Office Action for CN Application No. 201980048702.8 dated Dec. 24, 2021; 14 Pages.
Opinion dated Feb. 4, 2019; FR Application No. 1854219; 4 pages (non-English).
Search dated Feb. 4, 2019; FR Application No. 1854219; 2 pages (non-English).
Second Office Action dated Jul. 12, 2022; CN Application No. 201980048702.8; 11 pages (non-English).
Second Office Action dated Jul. 12, 2022; CN Application No. 201980048702.8; 14 pages (English).
Supplemental CN Search dated Jul. 5, 2022; CN Application No. 2019800487028; 1 page (non-English).
Third Office Action dated Oct. 14, 2022; CN Application No. 201980048702.8; 6 pages (English).
Third Office Action dated Oct. 14, 2022; CN Application No. 201980048702.8; 8 pages (non-English).

METHOD FOR MANUFACTURING A DENTAL BRUSHING PART, AND DENTAL BRUSHING PART

CROSS REFERENCE TO RELATED APPLICATIONS

This application is a National Stage of PCT Application No. PCT/FR2019/051081 filed on May 14, 2019, which claims priority to French Patent Application No. 18/54219 filed on May 22, 2018, the contents each of which are incorporated herein by reference thereto.

TECHNICAL FIELD

The present invention concerns the field of dental/tooth cleaning equipment.

BACKGROUND

The dental brushing is a task required for a good oral hygiene, but it is a task felt as tedious, and therefore often badly performed. In order to facilitate the brushing and ensure better gestures, it is well known to use electric toothbrushes, the heads of which are moved by motors. However, with such a brush, a good gesture of brushing is still necessary, and requires a minimum of dexterity and autonomy. Furthermore, the time required for a good brushing, generally 2 or 3 minutes, is often experienced as too long. On the other hand, for some specific populations, such as the elderly, dependent, frail persons, or even children, such a brush is not always adapted. In order to overcome these problems, it has been proposed a device comprising a substantially U-shaped brushing part, configured to be placed on the dentition of a user, internally forming a mouthpiece intended to receive all or part of the dentition of a jaw of a user; the mouthpiece thus formed, should be covered with/dressed in bristles intended for brushing the dentition, arranged on the inner walls of the mouthpiece so as to ensure the most effective brushing.

The known methods for inserting brushing bristles on the usual dental cleaning equipment, such as for example manual or electric toothbrushes, are not adapted for obtaining an effective brushing configuration when they are applied on the inner walls of the U-shaped mouthpiece of a brushing part configured to conform, as a whole, to the shape of all or part of the dentition to be cleaned. The known methods do not allow, in particular, to fasten ultra-fine and short bristles in a brushing part which should be flexible, fine and of a complex geometry. With the known methods, the brushing bristles are fastened on a wall of a simple geometry, such as a substantially planar surface for example, the inclination of the bristles relative to the surface not varying by more than about 15 degrees.

BRIEF SUMMARY

The aim of the invention is therefore to propose a solution to all or part of these problems.

To this end, the present invention concerns a method for manufacturing a brushing part, the brushing part being configured in a U-shape to be placed on the dentition of a jaw of a user, the brushing part internally forming a mouthpiece intended to receive all or part of this dentition, the brushing part comprising at least one tuft of brushing bristles protruding inside this mouthpiece by a free end of the bristles of the at least one tuft, the method comprising the following steps:

forming the at least one tuft of bristles, by assembling a plurality of bristles by one end opposite to the free end, so as to form a base of the at least one tuft;

fusing the ends forming the base of the at least one tuft so as to form a fused area in one piece, such that an extension of the fused area in a direction transverse to a direction of extension of the at least one tuft is greater than an extension of the base in the transverse direction before the fusing step;

placing the at least one tuft on a mold for overmolding the mouthpiece of the brushing part;

overmolding the mouthpiece and the at least one tuft.

The method according to the invention may further have one or more of the following features, taken alone or in combination.

According to one embodiment, the fusing step comprises a sub-step of heating the ends forming the base of the at least one tuft.

According to one embodiment, the fusing step is carried out before the placing step in order to have the space necessary for carrying out this fusing step, the fusing step being carried out with a tooling different from that used for the step of placing the at least one tuft on the overmolding mold.

According to one embodiment, the overmolding step comprises a sub-step of injecting a flexible plastic material, such that the fused area of the at least one tuft is inside a wall of the mouthpiece and taken in the flexible plastic material forming the mouthpiece, and such that the other end of the at least one tuft opposite to the fused area protrudes inside the mouthpiece which is formed by the overmolding step.

According to one embodiment, the flexibility of the material injected during the injection sub-step is advantageously comprised between 10 shore A and 100 shore A, for example between 50 and 70 shore A.

Thanks to these arrangements, ultra-fine and short bristles can be fastened and securely held, with variable inclinations, on the wall of a mouthpiece of the brushing part made of flexible material, said wall can be thin and of complex geometry.

According to one embodiment, a thickness of a wall of the mouthpiece formed by the brushing part is less than 3 mm, preferably less than 2.5 mm, more preferably less than 1 mm.

According to one embodiment, the overmolding mold comprises at least one hole on one face of the mold, said at least one hole comprising an inlet opening whose inner diameter gradually decreases between an inlet section and an outlet section having a diameter which is smaller than a diameter of the inlet section and wherein the placing step comprises a sub-step of inserting, in the at least one hole, the free end of the bristles of the at least a tuft, by entering through the inlet opening, until the end, after passing through the outlet section of the inlet opening of the at least one hole, is in contact with the bottom of the at least one hole, the outlet section of the inlet opening then being obstructed by a portion of the tuft, so as to close and seal the outlet section of the inlet opening of at least one hole.

Thanks to these arrangements, the funnel-shaped opening of the hole facilitates the insertion of the end of the tuft by guiding the free end of the bristles.

According to one embodiment, the step of placing the tuft can be manual or automated.

According to one embodiment, the step of placing the at least one tuft seals the outlet section of the inlet opening of the hole of the mold, such that the flexible plastic material, injected during the overmolding step to form the brushing part, does not reach the free end of the at least one tuft which protrudes inside the mouthpiece.

According to one embodiment, the fused area of the at least one tuft is between the inlet section and the outlet section of the inlet opening of the at least one hole on the face of the overmolding mold; more specifically, the fused area is located at a distance from the outlet section of at least 0.5 mm, such that the fused area is ultimately located inside, and not at the surface, of the wall of the brushing part. According to these arrangements, the sealing is ensured by the bristles of the tuft, and not by the fused area.

According to one embodiment, the method comprises the following complementary step:
 shaping the free end of the bristles of the plurality of bristles of the at least one tuft According to one embodiment each bristle of the plurality of bristles is a filament.

According to one embodiment, the step of shaping the free end of the bristles consists in giving a rounded shape, or a needle shape, to the free end of each filament of the plurality of bristles.

According to one embodiment, the free ends of the bristles of the bristle tuft are in a transverse plane, or in a non-transverse plane, to the direction of extension of the bristle tuft. According to these arrangements, the free end of the at least one tuft is parallel, or not, to a plane of extension of the fused area.

According to one embodiment, the step of shaping the free end of bristles is carried out before the placing step in order to have the necessary space for carrying out this step.

According to one embodiment, the step of shaping the free end of the bristles can be carried out before the steps of placing the tuft and of overmolding, in order to facilitate this shaping, which would be made very difficult after the placement of the tufts and the overmolding of the mouthpiece, due to the small volume inside the mouthpiece available to perform this shaping operation.

According to one embodiment, the step of shaping the free end of the bristles allows improving the effectiveness of the brushing by the brushing piece.

According to one embodiment, the flexible plastic material which is injected during the overmolding step is chemically compatible with the material in which the bristles are made.

According to one embodiment, the bristles are made of nylon or animal silk or polybutylene terephthalate.

According to one embodiment, the flexible plastic material is an elastomeric thermoplastic material, preferably a Styrene-Ethylene-Butylene-Styrene.

The chemical compatibility of two materials means that when these materials are in contact with each other under suitable conditions, they react chemically so as to adhere strongly to each other, as if they were glued to each other.

Thus, according to one embodiment, the used chemically compatible materials are, on the one hand, all materials of the family of elastomeric thermoplastics, preferably Styrene-Ethylene-Butylene-Styrene, for carrying out the overmolding of the brushing part, with, on the other hand, all materials of the family of polyamides, preferably Nylon, for example nylon 612, for the production of brushing bristles According to one embodiment, the used chemically compatible materials are, on the one hand, all materials of the family of silicones, for carrying out the overmolding of the brushing part, with, on the other hand, all materials of the family of polyamides, preferably Nylon, for example nylon 612, for the production of brushing bristles.

Those skilled in the art will be able to determine, among the materials of the aforementioned families, those which are most adapted for the use referred to herein.

According to one embodiment, the tufts are held in the wall of the mouthpiece of the brushing part, not only mechanically by the presence of the fused area inside the wall, but also by the chemical adhesion of the materials of the fused area and the wall of the mouthpiece. Thus, the chemical compatibility of the materials of the fused area and the wall of the mouthpiece improves the hook of the tuft on the mouthpiece. This hook is further improved by enlarging the surface of the fused area formed at the base of the tuft and taken within the wall of the mouthpiece, which thereby provides a better resistance to tearing, and thus allows withstanding a force of at least 15 Newtons.

According to one embodiment, the bristles have a diameter comprised between 60 µm and 120 µm, preferably equal to 80µ.

According to one embodiment, the bristles have a length less than 8 mm, preferably equal to 7.5 mm.

Thanks to these arrangements, the bristles have dimensions which are compatible with the internal dimensions of the brushing part and are configured to effectively brush the teeth positioned inside the mouthpiece.

According to one embodiment, the at least one tuft is placed so that the direction of extension of the at least one tuft makes an angle of 45 degrees with a direction perpendicular to a face of the mouthpiece at the point where the at least one tuft protrudes from the face of the mouthpiece.

According to one embodiment, the at least one tuft comprises at least two tufts placed so that the direction of extension of one of the at least two tufts makes an angle of 90 degrees with the direction of extension of another of the at least two tufts.

Thanks to these arrangements, the bristle tufts are arranged to effectively brush the teeth which are positioned inside the mouthpiece.

According to one embodiment, the overmolding step is preceded by the following step:
 Positioning, against the mold of the brushing part, at least one branch located at one end of a connector, said at least one branch being configured to be inside a wall of the mouthpiece and taken in the material of the mouthpiece after the overmolding step, and to transmit, to the brushing part, the vibrations which are generated by a vibrating gripping handle connected to another end of the connector.

Thanks to these arrangements, the brushing part can be actuated by autonomous means to ensure an effective brushing of the dentition of a child or of a dependent and frail person.

According to one embodiment, the invention also concerns a brushing brushing part configured in a U-shape to be placed on the dentition of a jaw of a user, the brushing part internally forming a mouthpiece intended to receive all or part of this dentition, the brushing part comprising at least one tuft of brushing bristles protruding inside this mouthpiece by a free end of the bristles of the at least one tuft,
 the at least one tuft of bristles, comprising a plurality of bristles which are assembled by one end, opposite to the free end, so as to form a base of the at least one tuft;
 the base of the at least one tuft forming a fused area in one piece, an extension of the fused area in a direction transverse to a direction of extension of the at least one tuft being greater than an extension of the base in the transverse direction before the formation of the fused area;

the fused area of the at least one tuft being inside a wall of the mouthpiece and taken in a flexible plastic material forming the mouthpiece, and the other end of the at least one tuft opposite to the fused area protruding inside the mouthpiece which is formed by the brushing part.

According to one embodiment, the bristles are made of nylon or animal silk or polybutylene terephthalate.

According to one embodiment, the flexible plastic material is an elastomeric thermoplastic material, preferably a Styrene-Ethylene-Butylene-Styrene.

According to one embodiment, the free end of the bristles can be rounded, or needle-shaped.

Thanks to these arrangements, chemical compatibility is ensured between the material constituting the fused area of the tuft, and the material of the brushing part, such that the mutual adhesion of these two materials is maximum and that the tufts are held in the brushing part not only mechanically by the presence of the fused area, but also by the chemical adhesion of the materials of the fused area, on the one hand, and of the brushing part, on the other hand.

According to one embodiment, the bristles have a diameter comprised between 60 µm and 120 µm, preferably equal to 80 µm.

According to one embodiment, the bristles have a length less than 8 mm, preferably equal to 7.5 mm.

Thanks to these arrangements, the bristles have dimensions which are compatible with the internal dimensions of the brushing part and are configured to effectively brush the teeth positioned inside the mouthpiece.

According to one embodiment, the direction of extension of the at least one tuft makes an angle of 45 degrees with a direction perpendicular to a face of the mouthpiece at the point where the at least one tuft protrudes from the face of the mouthpiece.

According to one embodiment, the at least one tuft comprises at least two tufts, the direction of extension of one of the at least two tufts making an angle of 90 degrees with the direction of extension of another of the at least two tufts.

According to one embodiment, the at least one tuft comprises a plurality of tufts, and the plurality of tufts is distributed in a staggered manner on the inner face of the mouthpiece, so as to maximize the density of bristles locally and thus improve the effectiveness of the brushing.

Thus, according to one embodiment of the method according to the invention, the holes are distributed in a staggered manner on the overmolding mold.

According to one embodiment, the wall of the mouthpiece comprises an inner portion of the wall, configured to be in contact with a tongue of a user of the brushing part, and an outer portion of the wall which faces the inner portion of the wall, by being separated therefrom by a variable distance; at least one portion of the inner portion of the wall, said at least one portion being located at one end of a branch of the U formed by the brushing part, has a lower height towards the end of the branch of the U than the height of a corresponding portion of the outer portion of the wall, said corresponding portion being located substantially in front of the at least one portion of the inner portion of the wall; this has the effect of leaving a more significant leeway for the positioning of the tongue, and thus avoiding a gag reflex in some people.

According to one embodiment, a portion of the inner portion of the inner wall of the mouthpiece, said portion being located between the two branches of the U formed by the brushing part, has a height which is lower than the height of a corresponding portion of the outer portion of the wall, said corresponding portion being located substantially in front of the at least one portion of the inner portion of the wall; thus, when the brushing part is intended for use on an upper arcade, this arrangement allows preventing the part from bearing on the palate which is a sensitive area.

According to one embodiment, a portion of the outer portion of the wall of the mouthpiece is thickened; this allows ensuring that the bristles touch the concerned portion of the dentition and thus ensuring that all teeth are well brushed.

In one embodiment, the distance between the inner portion of the wall and the outer portion of the wall is configured to ensure that all teeth are in contact with at least one tuft.

Thanks to these arrangements, the bristle tufts are arranged to effectively brush the teeth positioned inside the mouthpiece.

According to one embodiment, the brushing part comprises at least one branch fastened to one end of a connector, said at least one branch being configured to transmit, to the brushing part, vibrations which are generated by a vibrating gripping handle connected to another end of the connector.

According to one embodiment, said at least one branch is positioned inside the wall of the bottom, or inside the lateral wall, of the mouthpiece.

According to one embodiment, the flexible plastic material which is injected during the overmolding step is chemically compatible with the material in which at least one branch is made. Thanks to these arrangements, at least one branch and the brushing part adhere to each other.

Thus, according to one embodiment, the used chemically compatible materials are, on the one hand, all materials of the family of elastomeric thermoplastics, preferably Styrene-Ethylene-Butylene-Styrene, for carrying out the overmolding of the brushing part, with, on the other hand, for the production of the at least one branch, all materials of the family of polypropylenes, or all materials of the family of ABS (Acrylonitrile Butadiene Styrene), or all materials of the family of PU (polyurethane), or all materials from the family of PC (polycarbonate), or all materials of the family of PA (polyamide), or all materials of the family of PE (polyethylene).

According to one embodiment, the used chemically compatible materials are, on the one hand, all materials of the family of silicones, for carrying out the overmolding of the brushing part, with, on the other hand, for producing the at least one branch, all materials from the family of polypropylenes, or all materials from the family of ABS (Acrylonitrile Butadiene Styrene), or all materials from the family of PU (polyurethane), or all materials from the family of PC (polycarbonate), or all materials of the family of PA (polyamide all materials of the family of PE (polyethylene).

Those skilled in the art will be able to determine, among the materials of the aforementioned families, those which are most adapted for the use referred to herein.

Thanks to these arrangements, the brushing part can be actuated by autonomous means to ensure an effective brushing of the dentition of a child or of a dependent and frail person.

According to one embodiment, the invention also concerns pack comprising:
  a brushing part according to the invention;
  a gripping handle, configured to be connected to the connector of the brushing part, a stand for storing the gripping handle, the storage stand being configured to ensure a power supply to the handle.

BRIEF DESCRIPTION OF THE DRAWINGS

For a good understanding thereof, the invention is described with reference to the appended drawings representing, by way of a non-limiting example, an embodiment of a device according to the invention. The same references in the drawings designate similar elements or elements whose functions are similar.

FIG. 9 is a perspective view of an example of a two-part mold, with an upper portion in FIG. 9a and a lower portion in FIG. 9b, configured for the overmolding step.

DETAILED DESCRIPTION

Figure 1:
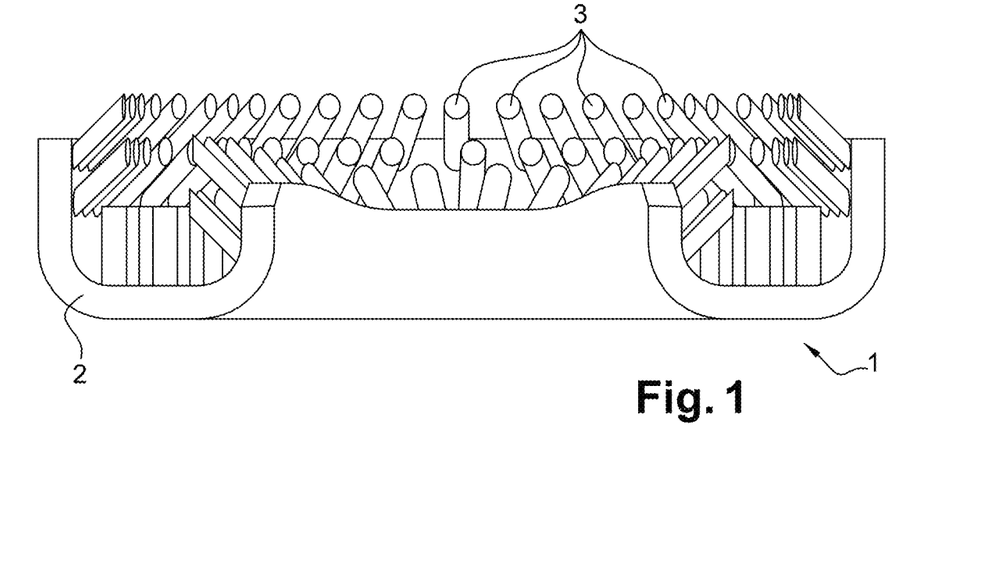
FIG. 1 is a sectional view of the brushing part.
Figure 2:
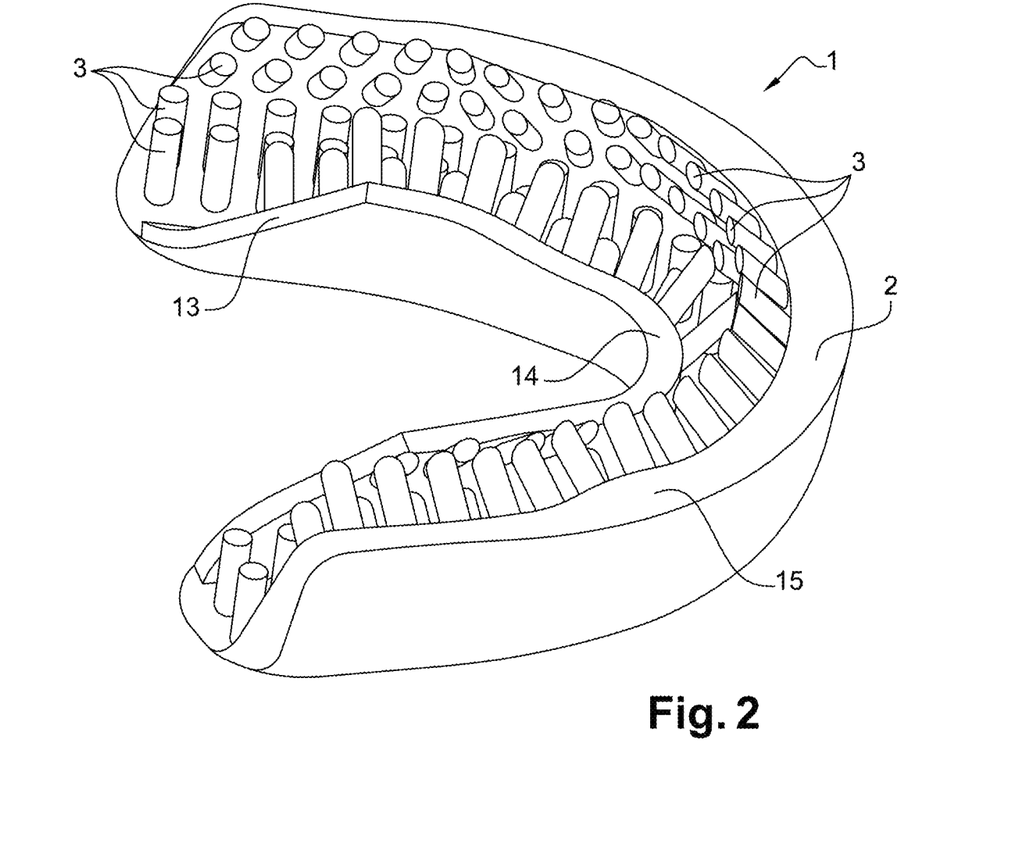
FIG. 2 is a perspective view of the brushing part.

FIGS. 1 and 2 illustrate, respectively in a sectional view and a perspective view, an embodiment of the brushing part 1, object of the invention according to a first aspect.

According to one embodiment, the brushing part 1 is configured in a U-shape to be placed on the dentition of a jaw of a user. The brushing part 1 comprises a portion 2 in the form of a mouthpiece, intended to receive all or part of this dentition. This portion 2 will be called mouthpiece in the remainder of this description. The brushing part 1 comprises at least one tuft 3 of bristles 4, preferably a plurality of tufts 3 disposed and distributed on the inner faces of the mouthpiece 2, the tufts protruding inside this mouthpiece 2

Figures 3, 4, 5:
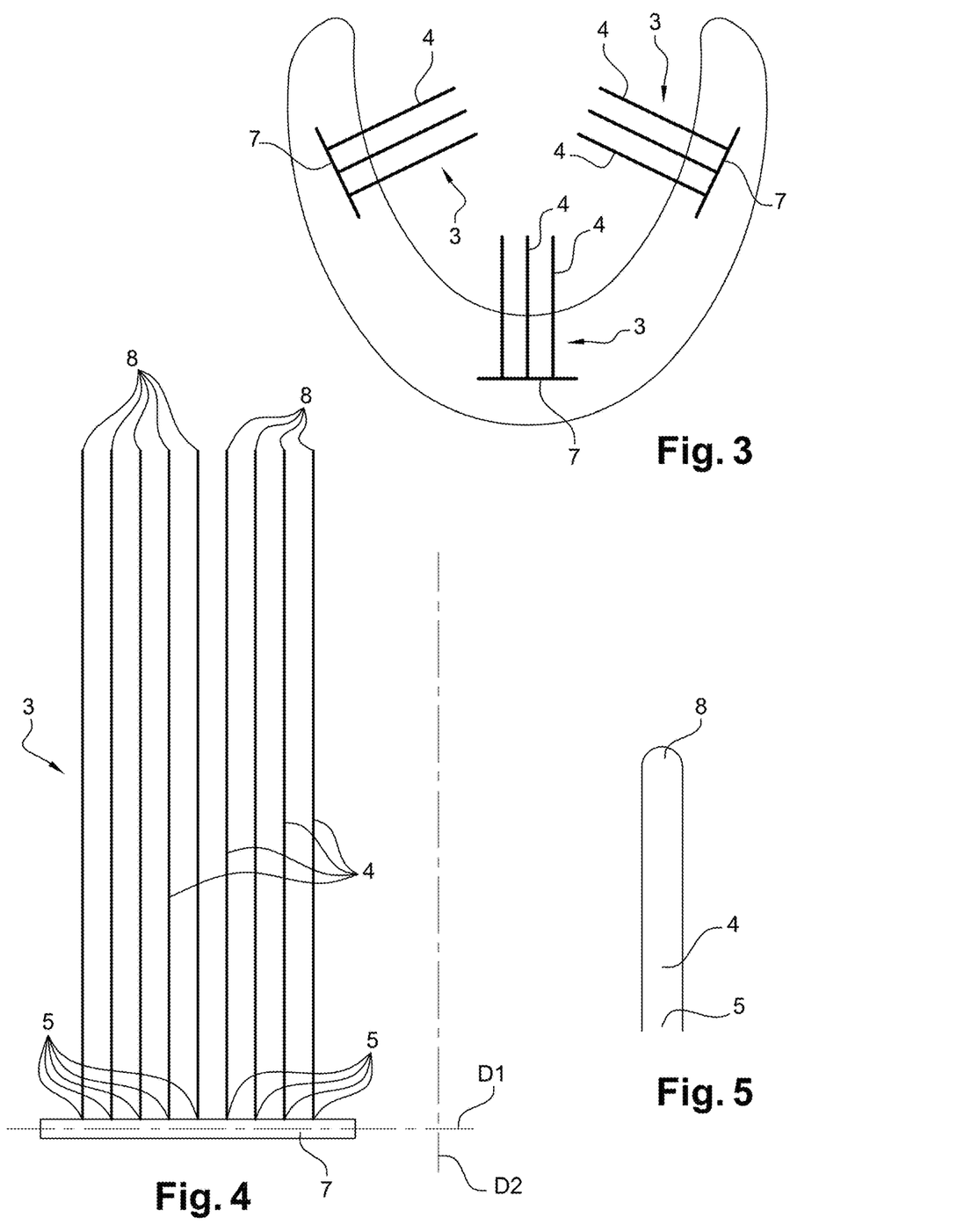
FIG. 3 is a simplified sectional view of the mouthpiece of the brushing part and three bristle tufts.
FIG. 4 is a simplified representation of a bristle tuft.
FIG. 5 is a simplified representation of a bristle

The at least one tuft 3 of bristles 4 comprises a plurality of bristles 4 which are assembled by one end 5 so as to form a base of the at least one tuft 3, as represented in FIGS. 3 and 4 in a very simplified manner; the base of the at least one tuft 3, comprising the assembly formed by the juxtaposition of one of the ends 5 of the bristles assembled into a tuft 3, is fused 7, by heating for example, so as to form a fused area 7, said fused area being constituted in one piece in the material of the bristles 4. The material of the bristles can be made of nylon, or animal silk, or else polybutylene terephthalate (PBT) for example. The bristles 4 of a tuft 3 have a length preferably less than 8 mm, preferably equal to 7.5 mm. The bristles are preferably substantially rectilinear filaments, preferably ultra-fine, that is to say that the diameter of the filaments is comprised between 60 km and 120 km, preferably 80 km. Thanks to these arrangements, the bristles have dimensions which are compatible with the internal dimensions of the brushing part and can be arranged inside the mouthpiece 2 to effectively brush the teeth which are also placed inside the mouthpiece 2.

Each tuft 3 is longer, in a direction of extension D2, than it is wide or thick, in a direction D1 transverse to direction D2. The extension in direction D1 of the base of a tuft 3 before the fusing of the ends 5 of the bristles 4 forming the base of the tuft is less than the extension in the direction D1 of the fused area 7. The fusion of the material of the bristles at the ends 5 causes an expansion of the base of the tuft 3, which thus takes an inverted mushroom shape as illustrated in FIGS. 3 and 4.

The free ends 8 of the bristles 4 of a tuft 3 are rounded for a brushing which is effective and without risk for the gum.

The free ends 8 of the bristles 4 of a tuft 3 protrude from the inner faces of the wall of the mouthpiece 2 of the brushing part 1, while the fused area 7 of a tuft 3 is taken from the material which is used to form the wall of the mouthpiece 2, inside this wall. Thus the tuft 3 is securely held in and by the wall of the mouthpiece 2.

The material which is used to form the wall of the mouthpiece 2 should be a flexible plastic material, in order to allow a sufficient adjustment of the shape of the brushing part 1 to the shape of the dentition of the user of the brushing part 1.

In order to improve the holding of the tuft 3, it is possible to choose a flexible plastic material that is chemically compatible with the material of the bristles 4 and the fused area 7. When the material of the bristles 4 is made of nylon, in order to form the mouthpiece 2, a material which is chemically compatible with nylon will thus be chosen, for example an elastomeric thermoplastic material, preferably a Styrene-Ethylene-Butylene-Styrene.

Thus, the chemical compatibility being ensured between the material constituting the fused area of the tuft, and the material of the brushing part, such that the mutual adhesion of these two materials is maximum and that the tufts are held in the brushing part, not only mechanically by the presence of the fused area, but also by the chemical adhesion of the materials of the fused area, on the one hand, and of the brushing part, on the other hand. Thanks to these arrangements, the adhesion of the fused area 7 of a tuft 3 in the wall of the mouthpiece 2 can withstand a tensile force of 15 Newtons.

In order to improve the effectiveness of the brushing, a plurality of tufts 3 are distributed on the inner faces of the wall of the mouthpiece 2; as illustrated in FIGS. 1 to 3, the direction of extension D2 of a tuft 3 has an inclination relative to the direction perpendicular to the face considered at the point where the tuft 3 protrudes on the face of the mouthpiece 2, which can vary between 0 degrees, for example for a tuft 3 planted on the inner face of the mouthpiece, and 45 degrees, for example, preferably directed upwardly of the mouthpiece, for a tuft 3 planted on one of the lateral faces of the mouthpiece 2. Thus the direction of extension D2 of a tuft 3 can form an angle of 90 degrees, for example with the direction of extension D2 of another tuft 3. Thanks to these arrangements, the bristle tufts are arranged to effectively brush the teeth positioned inside the mouthpiece.

According to one embodiment of the invention, the distribution of the bristle tufts protruding from the inner face of the mouthpiece 2 is adjusted so as to maximize the density of bristles locally and thus improve the effectiveness of the brushing. To this end, a distribution in a staggered manner of the holes on the overmolding mold is chosen.

According to one embodiment, the shape of the mouthpiece, and in particular the slope of the inner wall of the mouthpiece, is adjusted so as to limit a gag reflex when using the brushing part, or so as to promote a good contact of the bristles at some teeth, canines, incisors or molars for example.

More specifically, as illustrated in FIG. 2, the wall of the mouthpiece 2 comprises an inner portion of the wall, portions 13 and 14 of which are represented in FIG. 2, and an outer portion of the wall including one portion 15 which is also represented in FIG. 2. The inner portion of the wall is configured to be in contact with the tongue of a user of the brushing part 1. The outer portion of the wall faces the inner portion of the wall, by being separated therefrom by a variable distance according to the considered portion of the wall. The slope of the portions 13 of the inner portion of a wall of the mouthpiece 2, said portions being located at the ends of each branch of the U formed by the brushing part, is less steep than the slope of the corresponding portions of the outer wall portion of the mouthpiece 2, in order to leave a greater freedom for the positioning of the tongue, and thus to avoid a gag reflex in some people.

As illustrated in FIG. 2 also, another portion 14 of the inner wall of the mouthpiece 2 can be lowered when the brushing part is intended to be used on the upper arcade, in order to prevent the part from bearing on the palate which is a sensitive area.

As illustrated in FIG. 2 also, a portion 15 of the outer wall of the mouthpiece 2 can be thickened in order to ensure that the bristles touch the 1st premolar. The human jaw is generally U-shaped, but just after the canine, that is to say at the first premolar, there is generally an offset. This thickening of the wall allows overcoming this gap and ensuring that all teeth are well brushed. Thus, the distance between the inner portion of the wall and the outer portion of the wall is variable so as to ensure a contact of the bristles on all teeth.

Figure 6:
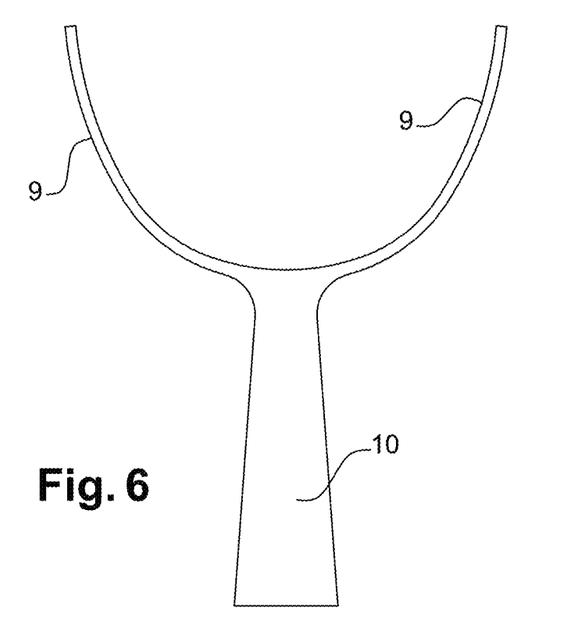
FIG. 6 is a top view of a two-branch connector
Figure 7:
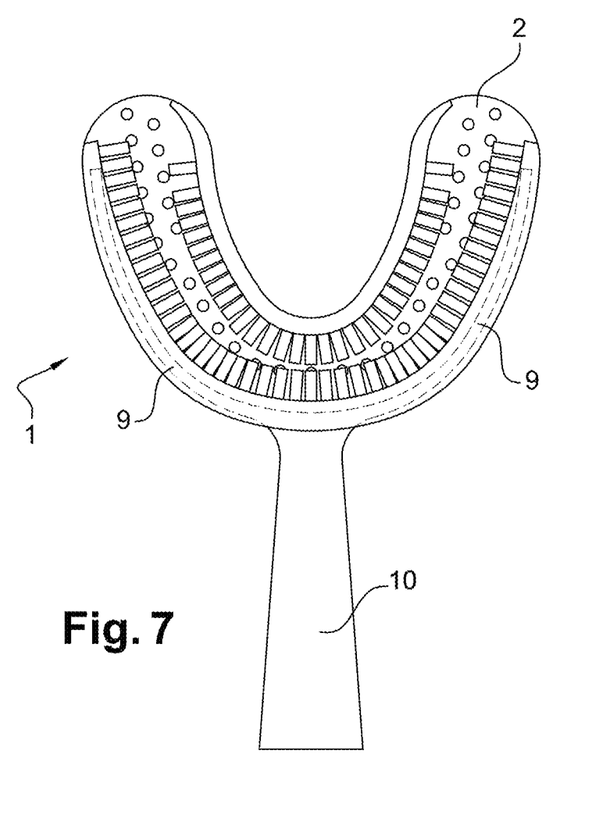
FIG. 7 is a top view of a connector mounted on a brushing part.

According to an embodiment illustrated in FIGS. 6 and 7, the brushing part 1 may comprise a connector 10, on one end of which at least one branch 9 is fastened, said branch 9 being configured to transmit, to the brushing part 1, vibrations which are generated by a vibrating gripping handle connected to another end of the connector 10. Thanks to these arrangements, the brushing part can be actuated by an autonomous means to ensure an effective brushing of the dentition of a dependent and frail person.

According to another aspect, the invention concerns a method 100 for manufacturing the brushing part 1. An embodiment of the method 100 according to the invention will now be described with reference to FIG. 8 which is a schematic representation of the steps of said method 100.

Figure 8:
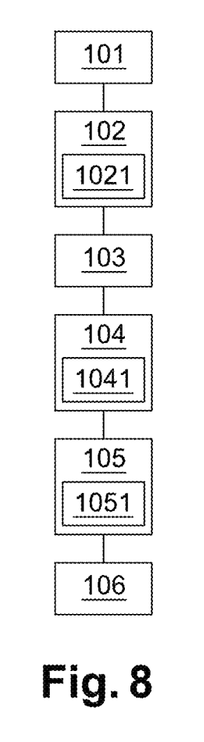
FIG. 8 is a schematic representation of the steps of the method.

According to one embodiment, the method 100 for manufacturing a brushing part 1 comprises the following steps, the chronology of implementation of said steps not being determined by the order in which said steps are mentioned:

Forming 101 at least one tuft 3 of bristles 4, by assembling a plurality of bristles 4 by one end 5, so as to form a base of the tuft 3;

Fusing 102 the ends 5 forming the base of the tuft 3 so as to form a fused area 7 constituted in one piece from the material of the bristles 4, made of nylon or animal silk or polybutylene terephthalate (PBT) for example; at the end of this step 102, an extension of the fused area 7 in a direction D1 transverse to a direction of extension D2 of the tuft 3 is greater than an extension of the base in the transverse direction D1, therefore than the thickness of the base of the tuft 3 before the fusing step 102; the tuft 3 then looks like an inverted mushroom, as illustrated in FIG. 4, with a fused area 7 which is more extensive in thickness than the rest of the tuft 3, which corresponds herein to the stem of said mushroom, while the fused area 7 took the shape of the head of said mushroom. The step 102 of fusing the ends 5 forming the base of the tuft 3 can for example comprise a sub-step 1021 of heating the ends 5 to a melting temperature of these ends 5.

Shaping 103 the free ends 8 of the bristles of the plurality of bristles 4 of the tuft 3, so as to give them, for example, a rounded shape or a needle shape.

placing 104 the tufts 3 thus prepared, on a mold 12b for overmolding the brushing part 1.

Figure 9A:
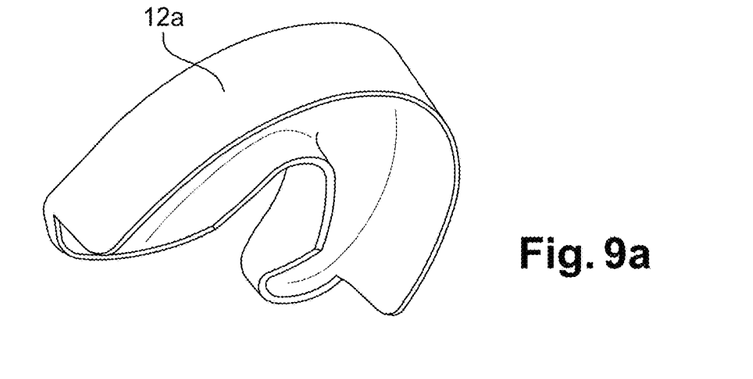
Figure 9B:
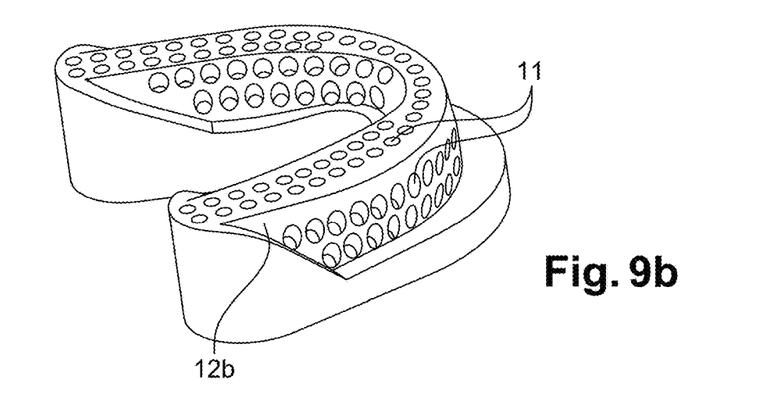
Figure 10:
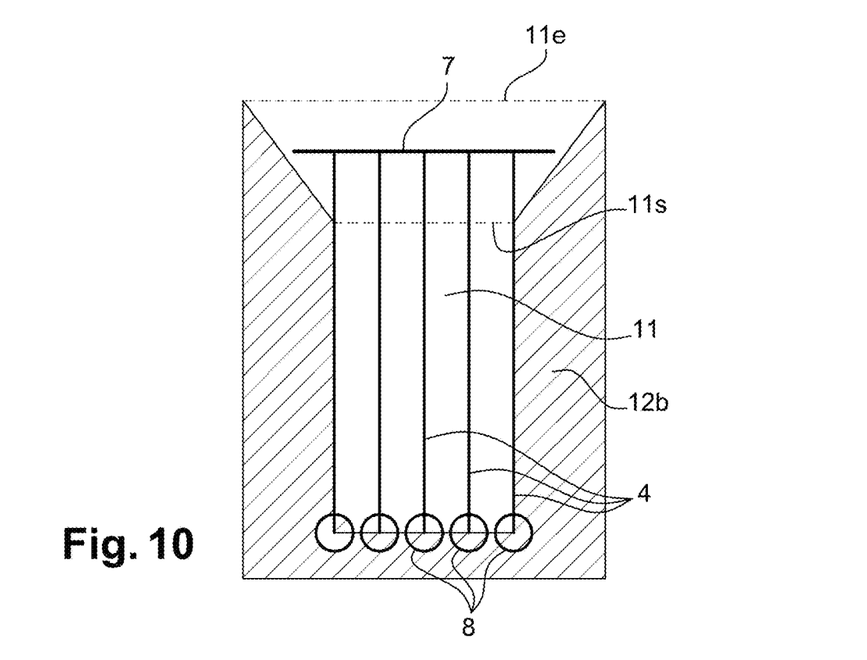
FIG. 10 is a sectional view of a hole in the overmolding mold, with a tuft which is inserted inside the hole.

According to one embodiment, the overmolding mold comprises two portions 12a, 12b as illustrated in FIGS. 9a and 9b, and, on one of the portions 12b, at least one hole 11 formed inside the lower face the mold which will be used to mold the inside of the mouthpiece 2; preferably, this face of the mold comprises as many holes 11 as there are tufts 3 which must be fastened protruding inside the mouthpiece 2; as illustrated in FIG. 10, said hole 11 comprises a funnel-shaped inlet opening, whose inner diameter gradually decreases between an inlet section 11e and an outlet section 11s whose diameter is smaller that of the inlet section 11e, step 104 of placing each tuft 3 on the mold 12b comprises a sub-step 1041 of inserting the tuft 3 into the hole 11 starting with the free end 8 of the bristles of the tuft 3, the end 8 being that opposite to the fused area 7 of the tuft 3, by entering the hole 11 through the inlet section 11e, until the end 8, after passing through the inlet opening 11e of the hole 11, is in abutment on the bottom of the hole 11 on the face of the mold 12b. Thanks to these arrangements, the funnel-shaped entry opening, of the hole 11 facilitates the insertion of the end of the tuft by guiding the free end 8 of the bristles 4.

overmolding 105 the mouthpiece 2 and the at least one tuft 3. The overmolding step 105 may comprise a sub-step 1051 for injecting a flexible plastic material inside the mold 12a, 12b, formed by the two portions 12a, 12b of the mold placed on top of each other so as to form a closed mold, and such that the fused area 7 of the at least one tuft 3 is inside the closed mold; after injecting the plastic material inside the closed mold, the fused area 7 is located inside the wall of the overmolded mouthpiece 2 and taken into the flexible plastic material forming the wall of the mouthpiece 2, and of such that the other end 8 of the at least one tuft 3 which is opposite to the fused area 7 protrudes inside the mouthpiece 2 formed in the overmolding step 105.

According to one aspect of the invention, the step 104 of placing the tufts 3 seals the outlet section 11s of the inlet opening of the hole 11 of the mold, such that the flexible plastic material injected during the overmolding step 105 to form the wall of the mouthpiece 2 of the brushing part 1 does not reach the portion of the tuft 3 which is in the hole 11 beyond the outlet section 11s of the inlet opening of the hole 11, and which protrude inside the mouthpiece 2 which is formed in the overmolding step 105.

Thanks to these arrangements, the preparation of the tufts 3 being carried out as indicated, before the overmolding 105, it is possible to form the tufts 3 with ultra-fine, short bristles 4, whose free end 8 is formed according to demand, rounded or needle-shaped, and which can be fastened, with variable inclinations, on the wall of the mouthpiece 2 of a brushing part 1 made of a flexible material, said wall may be thin and of complex geometry.

According to one embodiment, the free ends of the bristles of the bristle tuft are in a plane transverse to the direction of extension of the tuft of bristles, as illustrated in FIG. 3 and on some tufts represented in FIG. 1 or 2.

According to one embodiment, the free ends of the bristles of the bristle tuft are in a plane which is not transverse to the direction of extension of the bristle tuft, as illustrated on some tufts represented in FIG. 1 or 2.

According to one embodiment, the fusing step 102 is carried out before the placing step 104.

According to one embodiment, the shaping step 103 is carried out before the placing step 104.

Furthermore, the choice of a flexible plastic material for the overmolding 105 of the wall of the mouthpiece 2, chemically compatible with the material of the bristles 4, and of the fused area 7 of the tuft 3, allows ensuring a better adhesion of these two materials to each other and a very good holding of the tufts 3 in the wall of the mouthpiece 2 of the brushing part 1.

According to one embodiment, the overmolding step 105 is preceded by a step 106 of positioning, against the mold of the brushing part, at least one branch 9 fastened to one end of a connector 10, said branch 9 being configured to be inside the wall of the mouthpiece 2 and taken in the material of the mouthpiece 2 after the overmolding step 105, and to transmit, to the brushing part 1, the vibrations which generated by a vibrating gripping handle connected to another end of the connector 10.

According to one embodiment, said branch 9 is positioned inside the bottom wall of the mouthpiece (this embodiment is not represented in the figures) or inside the lateral wall of the mouthpiece, as illustrated in FIG. 7.

Thanks to these arrangements, the brushing part 1 obtained with the method according to the invention can be actuated by autonomous means to ensure an effective brushing of the dentition of a dependent and frail person.

According to one aspect of the invention, it also concerns a pack comprising:
  a brushing part as previously described, equipped with a connector
  a gripping handle configured to be connected to the connector,
  a stand for storing the gripping handle configured to recharge a power supply to the handle.

The invention claimed is:

1. A method for manufacturing a brushing part, the brushing part being configured in a U-shape to be placed on a dentition of a jaw of a user, the brushing part internally forming a mouthpiece intended to receive all or part of the dentition, the brushing part comprising at least one tuft of brushing bristles protruding inside the mouthpiece, the method comprising the following steps:
  forming the at least one tuft of brushing bristles, by assembling a plurality of bristles by an end opposite to a free end, so as to form a base of the at least one tuft of brushing bristles;
  fusing ends of the plurality of bristles forming the base of the at least one tuft of brushing bristles so as to form a fused area in one piece, such that an extension of the fused area in a direction transverse to a direction of extension of the at least one tuft of brushing bristles is greater than an extension of the base in the transverse direction before the fusing step;
  placing the at least one tuft of brushing bristles on a mold for overmolding the mouthpiece of the brushing part; and
  overmolding the mouthpiece and the at least one tuft of brushing bristles and wherein the overmolding step comprises a sub-step of injecting a flexible plastic material, such that the fused area of the at least one tuft of brushing bristles is inside a wall of the mouthpiece and taken in the flexible plastic material forming the mouthpiece, and such that an other end of the at least one tuft of brushing bristles opposite to the fused area protrudes inside the mouthpiece which is formed by the overmolding step.

2. The method according to claim 1, wherein the fusing step comprises a sub-step of heating the ends of the plurality of bristles forming the base of the at least one tuft of brushing bristles.

3. The method according to claim 2, wherein the overmolding step comprises a sub-step of injecting a flexible plastic material, such that the fused area of the at least one tuft of brushing bristles is inside a wall of the mouthpiece and taken in the flexible plastic material forming the mouthpiece, and such that an other end of the at least one tuft of brushing bristles opposite to the fused area protrudes inside the mouthpiece which is formed by the overmolding step.

4. The method according to claim 3, wherein the overmolding mold comprises at least one hole on one face of the mold, the at least one hole comprising an inlet opening whose inner diameter gradually decreases between an inlet section and an outlet section having a diameter which is smaller than a diameter of the inlet section and wherein the placing step comprises a sub-step of inserting, in the at least one hole, the free end of the plurality of bristles of the at least one tuft of brushing bristles, by entering through the inlet opening, until the free end of the plurality of bristles, after passing through the outlet section of the inlet opening of the at least one hole, is in contact with the bottom of the at least one hole, the outlet section of the inlet opening then being obstructed by a portion of the at least one tuft of brushing bristles, so as to close and seal the outlet section of the inlet opening of at least one hole.

5. The method according to claim 4, comprising the following complementary step:
  shaping the free end of the plurality of bristles of the at least one tuft of brushing bristles.

6. The method according to claim 5, wherein the flexible plastic material which is injected during the overmolding step is chemically compatible with a material in which the plurality of bristles are made.

7. The method according to claim 6, wherein the flexible plastic material is an elastomeric thermoplastic material, preferably a Styrene-Ethylene-Butylene-Styrene.

8. The method according to claim 1, wherein the overmolding mold comprises at least one hole on one face of the mold, the at least one hole comprising an inlet opening whose inner diameter gradually decreases between an inlet section and an outlet section having a diameter which is smaller than a diameter of the inlet section and wherein the placing step comprises a sub-step of inserting, in the at least one hole, the free end of the plurality of bristles of the at least one tuft of brushing bristles, by entering through the inlet opening, until the free end of the plurality of bristles, after passing through the outlet section of the inlet opening of the at least one hole, is in contact with the bottom of the at least one hole, the outlet section of the inlet opening then being obstructed by a portion of the at least one tuft of brushing bristles, so as to close and seal the outlet section of the inlet opening of at least one hole.

9. The method according to claim 1, comprising the following complementary step:
  shaping the free end of the plurality of bristles of the at least one tuft of brushing bristles.

10. The method according to claim 1, wherein the flexible plastic material which is injected during the overmolding step is chemically compatible with a material in which the plurality of bristles are made.

11. The method according to claim 1, wherein the flexible plastic material is an elastomeric thermoplastic material, preferably a Styrene-Ethylene-Butylene-Styrene.

12. The method according to claim 1, wherein the overmolding step is preceded by the following step:
- positioning, against the mold of the brushing part, at least one branch located at one end of a connector, said at least one branch being configured to be inside a wall of the mouthpiece and taken in a material of the mouthpiece after the overmolding step, and to transmit, to the brushing part, vibrations which are generated by a vibrating gripping handle connected to another end of the connector.

13. A brushing part configured in a U-shape to be placed on a dentition of a jaw of a user, the brushing part internally forming a mouthpiece intended to receive all or part of the dentition, the brushing part comprising at least one tuft of brushing bristles protruding inside this mouthpiece,
- the at least one tuft of brushing bristles, comprising a plurality of bristles which are assembled by one end, opposite to a free end, so as to form a base of the at least one tuft of brushing bristles;
- the base of the at least one tuft of brushing bristles forming a fused area in one piece, an extension of the fused area in a direction transverse to a direction of extension of the at least one tuft of brushing bristles being greater than an extension of the base in the direction transverse to the direction of extension of the at least one tuft of brushing bristles before formation of the fused area;
- the fused area of the at least one tuft of brushing bristles being inside a wall of the mouthpiece and taken in a flexible plastic material forming the mouthpiece, and an other end of the at least one tuft of brushing bristles opposite to the fused area protruding inside the mouthpiece which is formed by the brushing part.

14. The brushing part according to claim 13, wherein the plurality of bristles are made of nylon or animal silk or polybutylene terephthalate.

15. The brushing part according to claim 13, wherein the plurality of bristles have a diameter comprised between 60 µm and 120 µm, preferably equal to 80 µm.

16. The brushing part according to claim 13, wherein the plurality of bristles have a length less than 8 mm, preferably equal to 7.5 mm.

17. The brushing part according to claim 13, wherein a direction of extension of the at least one tuft of brushing bristles makes an angle of 45 degrees with a direction perpendicular to a face of the mouthpiece at a point where the at least one tuft of brushing bristles protrudes from the face of the mouthpiece.

18. The brushing part according to claim 13, comprising at least one branch fastened to one end of a connector, the at least one branch being configured to transmit, to the brushing part, vibrations which are generated by a vibrating gripping handle connected to another end of the connector.

19. A pack comprising:
- a brushing part according to claim 18;
- a gripping handle, configured to be connected to the connector of the brushing part; and
- a stand for storing the gripping handle, the storage stand being configured to ensure a power supply to the handle.

* * * * *